United States Patent
Nakagawa et al.

(10) Patent No.: US 6,338,772 B1
(45) Date of Patent: Jan. 15, 2002

(54) POLYOLEFIN SYNTHETIC PULP AND USE THEREOF

(75) Inventors: Norihiko Nakagawa; Masaki Shoji; Toshikazu Senoo; Makoto Nakamaru; Yukio Kouno, all of Ichihara (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/428,160

(22) Filed: Oct. 27, 1999

(30) Foreign Application Priority Data

Oct. 27, 1998 (JP) .......................................... 10-305380
Sep. 6, 1999 (JP) .......................................... 11-251170

(51) Int. Cl.$^7$ ............................................. D21H 27/38
(52) U.S. Cl. ..................... 162/129; 162/146; 162/157.5
(58) Field of Search ................................ 162/146, 129, 162/157.5

(56) References Cited

U.S. PATENT DOCUMENTS

| | | | | |
|---|---|---|---|---|
| 3,708,555 A | * | 1/1973 | Gaylord | 162/157.5 |
| 3,848,027 A | * | 11/1974 | Forbess et al. | 162/157.5 |
| 3,891,499 A | * | 6/1975 | Kato et al. | 162/157.5 |
| 4,152,317 A | * | 5/1979 | Agouri et al. | 162/157.5 |
| 4,274,915 A | * | 6/1981 | Munari | 162/129 |
| 4,289,580 A | * | 9/1981 | Elston et al. | 129/129 |
| 4,613,635 A | | 9/1986 | Bither | |
| 5,173,154 A | * | 12/1992 | Heinrich | 162/129 |

FOREIGN PATENT DOCUMENTS

WO   WO96/07677   3/1996

OTHER PUBLICATIONS

Database WPI, Section Ch, Week 198306, Derwent Publications Ltd., London, GB; Class A97, AN 1983–13375K & JP 57 210100 A (Mitsui Petrochem Co LTD), Dec. 23, 1982 (Abstract).

Database WPI, Section Ch, Week 197621, Derwent Publications LTD., London, GB; Class A17, AN 1976–38703X & JP 51 040412 A (Toray IND INC.), Apr. 5, 1976 (Abstract).

* cited by examiner

Primary Examiner—Peter Chin

(57) ABSTRACT

A polyolefin synthetic pulp comprising a polyolefin resin graft-modified with an unsaturated carboxylic acid or a derivative thereof, and/or a polyolefin resin composition which comprises an ethylene/$\alpha,\beta$-unsaturated carboxylic acid copolymer and a polyethylene resin. Further, there is provided a heat sealing paper comprising a base fiber layer whose at least one surface is laminated and integrated with a layer of the polyolefin synthetic pulp. This polyolefin synthetic pulp has a large breaking length and an excellent internal bond strength, and exhibits stable heat sealing and hot tack properties over a wide temperature range from low to high temperature. The polyolefin synthetic pulp is suitable to use in battery separators, molding fiberboards, heat sealing papers and the like. The heat sealing papers have excellent heat sealing properties, and are characterized by having a large breaking length and an excellent internal bond strength and by exhibiting stable heat sealing and hot tack properties over a wide temperature range from low to high temperature.

30 Claims, No Drawings

POLYOLEFIN SYNTHETIC PULP AND USE THEREOF

FIELD OF THE INVENTION

The present invention relates to a polyolefin synthetic pulp for use in battery separators, molding fiberboards, heat sealing papers and the like and relates to a heat sealing paper including the polyolefin synthetic pulp.

BACKGROUND OF THE INVENTION

Conventionally, polypropylene (PP) single fibers and polyolefin synthetic pulps are widely used as binders for inorganic powders contained in battery separators, molding fiberboards and the like. They are also widely used in heat sealing papers such as tea bags, sterilizing papers and desiccant bags.

Cost saving through thickness reduction is recently demanded in the field of battery separators, molding fiberboards, heat sealing papers and the like, in which use is made of PP single fibers and polyolefin synthetic pulps. The fibers forming the synthetic pulp must have a large breaking length and a high internal bond strength for enabling reduction of the thickness of battery separators, molding fiberboards, heat sealing papers and the like. However, the conventional PP fibers and polyolefin synthetic pulps do not always have a large fiber breaking length or a satisfactory internal bond strength. Thus, there is room for improvement in this respect.

Therefore, there is a demand for a synthetic pulp which has a larger fiber breaking length and a greater internal bond strength than those of the conventional PP fibers and synthetic pulps, whose heat seal strength is comparable to or greater than that of the conventional PP fibers and synthetic pulps, and which enables a thickness reduction.

With respect to the heat sealing papers for use in tea bags, etc., the conventional mixed type composed of a mixture of pulp fiber and synthetic fiber is being converted to a heat sealing paper of double layer type consisting of a base layer composed mainly of pulp fiber which is laminated with a heat sealing layer composed mainly of synthetic fiber. The reason is to avoid synthetic fiber fusion to a hot plate, which occasionally occurs at a heat seal step in the use of the conventional mixed type to thereby cause a productivity drop.

Interlayer bonding strength with a base layer as fell as heat sealing and hot tack properties can be mentioned as requisite functions of the heat sealing layer of the heat sealing paper of double layer type. Of such requisite functions, stable heat sealing and hot tack properties over a wide sealing temperature range from low to high temperature are especially strongly demanded in accordance with the increase of the operation speed of a bag making machine, etc.

Synthetic fibers having been used in the heat sealing layer are, for example, single fibers prepared from polypropylene (PP) and synthetic pulps prepared from polyethylene (PE). However, the heat sealing papers From PP single fibers, although exhibiting excellent heat sealing and hot tack properties when the temperature is within a high temperature range, are poor in low-temperature-range heat sealing and hot tack properties. On the other hand, the heat sealing papers from PR synthetic pulps, although having low-temperature-range heat sealing and hot tack properties superior to those of the heat sealing papers from PP single fibers, are unsatisfactory in high-temperature-range heat sealing and hot tack properties as compared with those of the heat sealing papers from PP single fibers.

OBJECT OF THE INVENTION

The present invention has been made with a view toward solving the above drawbacks of the prior art. It is an object of the present invention to provide a polyolefin synthetic pulp which has a larger fiber breaking length and a greater internal bond strength than those of the conventional PP single fibers and polyolefin synthetic pulps, whose heat seal strength is comparable to or greater than that of the conventional PP fibers and synthetic pulps, and which enables a thickness reduction.

It is another object of the present invention To provide a polyolefin synthetic pulp which exhibits Stable heat sealing and hot tack properties over a wide temperature range from low to high temperature.

It is a further object of the present invention to provide a heat sealing paper composed of the above synthetic pulps which has excellent heat sealing properties and is suitable to use in a high-speed apparatus such as a high-speed bag making machine.

SUMMARY OF THE INVENTION

The first polyolefin synthetic pulp of the present invention comprises a polyolefin resin graft-modified with an unsaturated carboxylic acid or a derivative thereof.

The second polyolefin synthetic pulp of the present invention comprises a polyolefin resin composition, the polyolefin resin composition comprising 50 to 100% by weight of an ethylene/$\alpha,\beta$-unsaturated carboxylic acid copolymer whose $\alpha,\beta$-unsaturated carboxylic acid content is in the range of 1 to 20% by weight and 0 to 50% by weight of a polyethylene resin.

The third polyolefin synthetic pulp of the present invention comprises the mixture of the graft-modified polyolefin resin described above and the polyolefin resin composition described above.

The heat sealing paper of the present invention comprises a base fiber layer whose at least one surface is laminated and integrated with a layer of the above polyolefin synthetic pulp.

DETAILED DESCRIPTION OF THE INVENTION

First, the polyolefin synthetic pulp of the present invention will be described in detail below A polyolefin resin graft-modified with an unsaturated carboxylic acid or a derivative thereof, and/or a polyolefin resin composition comprising an ethylene/$\alpha,\beta$-unsaturated carboxylic acid copolymer and a polyethylene resin, is used as the starting material of the polyolefin synthetic pulp of the present invention.

Modified Polyolefin Resin

The modified polyolefin resin as the starting material of the first polyolefin synthetic pulp of the present invention is a polyolefin resin graft-modified with an unsaturated carboxylic acid or a derivative thereof.

Ethylene homopolymer, an ethylene/$\alpha$-olefin copolymer, propylene homopolymer or a propylene/$\alpha$-olefin copolymer is preferably used as the polyolefin resin prior to graft modification for forming this modified polyolefin resin.

It is preferred that the ethylene homopolymer for use as the polyolefin resin prior to graft modification exhibit a melt flow rate (MFR), as measured at 190° C. under a load of 2.16 kg in accordance with ASTM D-1238, of 0.01 to 1000 g/10 min, especially 0.1 to 500 g/10min, and still especially 1 to 100 g/10 min. The use of the ethylene homopolymer whose MFR falls within the above ranges enables obtaining a synthetic pulp which is highly branched and exhibits excellent intertwinement.

The ethylene/α-olefin copolymer for use as the polyolefin resin prior to graft modification is a copolymer of ethylene and an α-olefin having 3 to 20 carbon atoms. It is preferred that the copolymer have a density (ASTM D 1505) of 0.850 to 0.950 g/cm$^3$, especially 0.870 to 0.945 g/cm$^3$, and still especially 0.900 to 0.940 g/cm$^3$, and that the copolymer exhibit a melt flow rate (MFR), as measured at 190° C. under a load of 2.16 kg in accordance with ASTM D-1238, of 0.1 to 100 g/10 min, especially 0.5 to 50 g/10 min, and still especially 1 to 20 g/10 min. The use of the ethylene/α-olefin copolymer whose density and MFR fall within the above ranges enables obtaining a synthetic pulp which is highly branched and exhibits excellent intertwinement.

The α-olefin having 3 to 20 carbon atoms for use in the copolymerization with ethylene is, for example, propylene, 1-butene, 1-pentene, 3-methyl-1-butene, 4-methyl-1-pentene, 1-hexene, 1-octene, 1-decene, 1-dodecene, 1-tetradecene, 1-hexadecene, 1-octadecene or 1-eicosene.

It is generally preferred that the above ethylene/α-olefin copolymer have an ethylene content of 50 to less than 100 mol %, especially 80.0 to 99.5 mol %, and still especially 90.0 to 99.0 mol %.

It is preferred that the propylene homopolymer for use as the polyolefin resin prior to graft modification exhibit a melt flow rate (MFR), as measured at 230° C. under a load of 2.16 kg in accordance with ASTM D-1238, of 0.1 to 500 g/10 min, especially 0.5 to 100 g/10 min, and still especially 1 to 50 g/10 min. The use of the propylene homopolymer whose MFR falls within the above ranges enables obtaining a synthetic pulp which is highly branched and exhibits excellent intertwinement.

The propylene/α-olefin copolymer for use as the polyolefin resin prior to graft modification is a copolymer of propylene and an α-olefin having 2 or 4 to 20 carbon atoms. It is preferred that the copolymer have a melting point of 130 to 165° C. and that the copolymer exhibit a melt flow rate (MFR), as measured at 230° C. under a load of 2.16 kg in accordance with ASTM D-1238, of 0.1 to 500 g/10 min especially 0.5 to 100 g/10 min, and still especially 1 to 50 g/10 min. The use of the propylene/a olefin copolymer whose melting point and MFR fall within the above ranges enables obtaining a synthetic pulp which is highly branched and exhibits excellent intertwinement.

The α-olefin having 2 or 4 to 20 carbon atoms for use in the copolymerization with propylene is, for example, ethylene, 1-butene, 1-pentene, 3-methyl-1-butene, 4-methyl-1-pentene, 1-hexene, 1-octene, 1-decene, 1-dodecene, 1-tetradecene, 1-hexadecene, 1-octadecene or 1-eicosene.

It is generally preferred that the above propylene/α-olefin copolymer have a propylene content of 50 to less than 100 mol %, especially 80.0 to 99.5 mol %, and still especially 90.0 to 99.0 mol %.

The ethylene homopolymer, ethylene/α-olefin copolymer, propylene homopolymer and propylene/α-olefin copolymer for use as the polyolefin resin prior to graft modification can be produced by performing a monomer polymerization or copolymerization in the presence of the common catalyst such as Ziegler-Natta catalyst or metallocene catalyst by the customary polymerization method such as the vapor phase method, bulk method or slurry method.

The modified polyolefin resin for use in the present invention is a modification product obtained by grafting an unsaturated carboxylic acid or a derivative thereof onto the above polyolefin resin.

Examples of suitable unsaturated carboxylic acids and derivatives thereof (unsaturated carboxylic acids and the like) include unsaturated carboxylic acids such as acrylic acid, methacrylic acid, crotonic acid, maleic acid and itaconic acid; acid anhydrides such as maleic anhydride, itaconic anhydride, norbornenecarboxylic anhydride and tetrahydrophthalic anhydride; and hydroxyalkyl esters and hydroxyalkoxyalkyl esters such as 2-hydroxyethyl acrylate, 2-hydroxyethyl methacrylate, 3-hydroxypropyl acrylate and hydroxyethoxy methacrylate. In the present invention, maleic anhydride is especially preferred. These unsaturated carboxylic acids and the like can be used either individually or in combination.

The ratio of grafting by the unsaturated carboxylic acid or the like which has modified the above polyolefin resin is in the range of 0.01 to 10% by weight, preferably 0.1 to 5% by weight, in terms of the graft monomer of the unsaturated carboxylic acid or the like and based on the weight of polyolefin resin prior to graft modification. When the graft ratio falls within the above ranges, there can be obtained a synthetic pulp which is highly branched and exhibits excellent intertwinement, namely a synthetic pulp having a high internal bond strength.

The modified polyolefin resin for use in the present invention can be produced by the customary graft modification methods for polyolefin resins, for example, the method in which the polyolefin resin is reacted with the unsaturated carboxylic acid or derivative thereof by means of an extruder or the like without the use of any solvent to thereby effect a modification.

Irrespective of the mode of graft modification, the grafting reaction is preferably performed in the presence of a radical initiator so as to effectively accomplish the graftcopolymerization of the above graft monomer.

The radical initiator is generally used in an amount of 0.001 to 1 part by weight, preferably 0.01 to 0.5 part by weight, per 100 parts by weight of polyolefin resin.

An organic peroxide, an organic perester and an azo compound can be used as the radical initiator. Examples of suitable radical initiators include:

benzoyl peroxide, dichlorobenzoyl peroxide, dicumyl peroxide, di-t-butyl peroxide, 2,5-dimethyl-2.5-di (peroxidobenzoato)hexyne-3,1,4-bis(t-butylperoxyisopropyl)benzene, lauroyl peroxide, t-butyl peracetate, 2,5-dimethyl-2,5-di(t-butylperoxy) hexyne-3 and 2,5-dimethyl-2,5-di(t-butylperoxy) hexane;

t-butyl perbenzoate, t-butyl perphenylacetate, t-butyl perisobutylate, t-butyl per-sec-octoate, t-butyl perpivalate, cumyl perpivalate and t-butyl perdiethylacetate; and azobisisobutyronitrile and dimethyl azoisobutylate. Of these, dialkyl peroxides such as dicumyl peroxide, di-t-butyl peroxide, 2,5-dimethyl-2,5-di(t-butylperoxy) hexyne-3, 2,5-dimethyl-2,5-di(t-butylperoxy)hexane and 1,4-bis(t-butylperoxyisopropyl)benzene are preferably used.

In both the graft reaction in which the above radical initiator is used and the graft reaction in which no radical initiator is used, the reaction temperature is generally set at 120 to 350° C.

The use of this modified polyolefin resin enables obtaining a polyolefin synthetic pulp which has a larger fiber breaking length and a greater internal bond strength than those of the conventional polypropylene (PP) single fibers and synthetic pulps from polyolefin resins as the starting material. Further, the use of this modified polyolefin resin enables obtaining a polyolefin synthetic pulp whose heat seal strength is comparable to or greater than that of the conventional PP fibers and synthetic pulps.

Polyolefin Resin Composition

The polyolefin resin composition for forming the second polyolefin synthetic pulp of the present invention comprises 50 to 100% by weight of an ethylene/α,β-unsaturated carboxylic acid copolymer (A) whose α,β-unsaturated carboxylic acid content is in the range of 1 to 20% by weight and 0 to 50% by weight of a polyethylene resin (B).

<Ethylene/α,β-unsaturated carboxylic acid copolymer (A)>

The ethylene/α,β-unsaturated carboxylic acid copolymer (A) which is usable as a starting material component of the polyolefin resin composition contains α,β-unsaturated carboxylic acid units in a proportion of 1 to 20% by weight, preferably 5 to 10% by weight. When the α, β-unsaturated carboxylic acid content falls within this range, the synthetic pulp containing this copolymer exhibits desirable heat sealing and hot tack properties over a wide range from low to high temperature. Further, the synthetic pulp exhibits freeness satisfying wet use requirements.

Examples of suitable α,β-unsaturated carboxylic acids include acrylic acid, methacrylic acid, maleic acid, maleic anhydride, fumaric acid, itaconic acid, crotonic acid and hymic anhydride. In the present invention, the terminology "α,β-unsaturated carboxylic acid" in the second invention, also comprehends (includes) derivatives thereof such as methyl acrylate, methyl methacrylate and monomethyl maleate. Of these, acrylic acid and methacrylic acid which are monobasic acids are preferred.

Further, the ethylene/α,β-unsaturated carboxylic acid copolymer usable in the present invention may be in the form of an ionomer resin obtained by partially neutralizing at least some of the carboxyl groups of the copolymer with a metal ion such as $Na^+$, $K^+$, $Zn^{++}$, $Ca^{++}$ or $Mg^{++}$.

This ethylene/α,β-unsaturated carboxylic acid copolymer can be produced by, for example, directly copolymerizing ethylene and an α,β-unsaturated carboxylic acid Generally, the production can be effected by the high-pressure polymerization process. In this copolymerization, the aforementioned α,β-unsaturated carboxylic acids can be used either individually or in combination. For example, there can be mentioned a copolymerization of ethylene, methacrylic acid and methyl methacrylate or a copolymerization of ethylene, acrelic acid and methyl methacrylate.

<Polyethylene resin (B)>

The polyethylene resin (B) which is usable as a starting material component of the polyolefin resin composition may be a low-density or high-density ethylene homopolymer or an ethylene/α-olefin copolymer When the polyethylene resin is an ethylene homopolymer, it is preferred that the density thereof be in the range of 0.900 to 0.970 g/cm³, especially 0.920 to 0.970 g/m³, and that the melt flow rate (MFR) thereof as measured at 190° C. under a load of 2.16 kg in accordance with ASTM D- 1238 be in the range of 0.1 to 100 g/10 min, especially 1 to 20 g/10 min. The use of the ethylene homopolymer whose density and MFR fall within the above ranges enables obtaining a synthetic pulp in which pulp fibers are highly branched and exhibit excellent intertwinement of the above ethylene homopolymers, a high-density polyethylene having a density of 0.941 to 0.970 g/cm³ is most desirable.

On the other hand, when the polyethylene resin is an ethylene/α-olefin copolymer, it is preferred that the copolymer have an ethylene content of 90 to 99 mol % especially 95 to 99 mol %, an α-olefin content of 1 to 10 mol %, especially 1 to 5 mol %, and a density of 0.900 to 0.940 g/cm³, especially 0.920 to 0.940 g/cm³, and be a crystalline copolymer. The α-olefin for use in the copolymerization with ethylene is preferably an olefin having 3 to 20 carbon atoms, which is, for example, selected from among propylene, 1-butene, 1-pentene, 3-methyl-1-butene, 4-methyl-1-pentene, 1-hexene, 1-octene, 1-decene, 1-dodecene and 1-tetradecene.

This ethylene/α-olefin copolymer preferably exhibits a melt flow rate (MFR), as measured at 190° C. under a load of 2.16 kg in accordance with ASTM D-1238, of 0.1 to 100 g/10 min. The use of the ethylene/α-olefin copolymer whose density and MFR fall within the above ranges enable, obtaining a synthetic pulp in which pulp fibers are highly branched and exhibit excellent intertwinement.

Of these ethylene/α-olefin copolymers, an ethylene/1-butene copolymer, an ethylene/4-methyl-1-pentene copolymer and an ethylene/1-hexene copolymer which exhibit a density of 0.920 to 0.940 g/cm³ and an MFR of 1 to 10 g/10 min are especially preferred.

The above ethylene homopolymer and ethylene/α-olefin copolymer used as the polyethylene resin can be produced by homopolymerizing or copolymerizing ethylene optionally together with an α-olefin monomer in the presence of the common catalyst such as Ziegler-Natta catalyst or metallocene catalyst by the customary polymerization method such as the vapor phase method, bulk method, slurry method or solution method.

The polyolefin resin composition for use in the present invention comprises the above ethylene/α,β-unsaturated carboxylic acid copolymer (A) as a raw material and polyethylene resin (B) as another raw material. The polyolefin resin composition may be composed of either raw material (A) only or raw material (A) blended with up to 50% by weight, based on the total weight of raw material (A) and raw material (B),of raw material (B). Specifically. the blending ratio of raw material (A) to raw material (B) ((A)/(B), weight % ratio) is preferably in the range of 100/0 to 50/50, still preferably 90/10 to 50/50, and optimally 80/20 to 60/40. Provided that the total of raw material (A) and raw material (a) is 100% by weight. When the blending ratio of raw material (A) to raw material (B) falls within the above ranges, preferably the range of 90/10 to 50/50, there can be obtained an excellent synthetic pulp exhibiting a freeness satisfying wet use requirements and a polyolefin synthetic pulp which exhibits stable heat sealing and hot tack properties over a wide sealing temperature range from low to high temperature.

Mixture of the Graft-modified Polyolefin Resin and the Polyolefin Resin Composition The mixture for forming the third polyolefin synthetic pulp of the present invention comprises the graft-modified polyolefin resin and the polyolefin resin composition each of them described hereinbefore. In the third polyolefin synthetic pulp of the present invention, the mixing ratio by weight of the graft-modified polyolefin resin and the polyolefin resin composition is not limited and that is, the mixture may have the graft-modified polyolefin resin content of more than 0% to less than 100% by weight Polyolefin Synthetic Pulp The polyolefin synthetic pulp of the present invention can be obtained by forming the above modified polyolefin resin and/or polyolefin resin composition into a pulp.

Conventional methods can appropriately be employed for forming the above resin or resin composition into a pulp to thereby obtain a synthetic pulp. For example, processes for producing a synthetic pulp are described in detail in Encyclopedia of Chemical Technology 3rd ed, vol. 19, p. 420–425. For example, the process in which melt spun fibers are cut short and beaten and the process in which a melt flash or an emulsion flash is first conducted, followed by beating are described therein.

The process in which the above modified polyolefin resin and/or polyolefin resin composition is converted to a solution or an emulsion and flash-spun is suitable to the production of the synthetic pulp of the present invention. Especially, the emulsion flash process in which polyvinyl alcohol (PVA) is used as a hydrophilicity imparting agent is most suitable. When this process is employed, the PVA is preferably added in an amount of 0.01 to 10% by weight, still preferably 0.1 to 5% by weight, based on the total weight of polyolefin synthetic pulp including PVA. The added PVA is contained in or adheres to the obtained polyolefin synthetic pulp.

In the formation of the above resin and/or resin composition into a pulp, various additives can be added as long as the objects of the present invention are not departed from. Examples of such additives include an antioxidant, an antistatic agent, a weathering stabilizer, a pigment and the like.

The properties of the polyolefin synthetic pulp of the present invention are preferably such that the average fiber length thereof is in the range of 0.1 to 10 mm, especially 0.2 to 5 mm, and still especially 0.5 to 2 mm, and such that the freeness thereof in terms of Canadian Standard Freeness (CSF) is not greater than 700 cc. The polyolefin synthetic pulp whose average fiber length falls within the above range ensures excellent fiber intertwinement.

When the polyolefin synthetic pulp is produced from the modified polyolefin resin, with respect to the paper made under Example conditions indicated later, it is generally preferred that the fiber breaking length thereof be in the range of 3 to 8 km and that the internal bond strength thereof be in the range of 3 to 8 kg·cm, depending on the way of use. Further, the seal strength realized when the heat seal temperature is 180° C. or higher is preferably 100 g or greater. In the use of this polyolefin synthetic pulp in various fields, a thickness reduction can be attained to a greater degree than in the use of conventional polyolefin synthetic pulps because of the greater internal bond strength.

Use of Polyolefin Synthetic Pulp

The polyolefin synthetic pulp of the present invention can be used as an additive or a sheet. Further, the polyolefin synthetic pulp of the present invention can be mixed with natural pulp and/or other synthetic pulp optionally together with organic fibers, inorganic fibers, inorganic powder, etc. and utilized in the production of various synthetic papers and sheets. The production of synthetic papers and sheets can be performed by the application of conventional technique. The synthetic paper and sheet obtained from the polyolefin synthetic pulp of the present invention, although usable as it is in various fields, can be used in the form of, for example, a laminate including another sheet.

The polyolefin synthetic pulp of the present invention having been sheeted is especially suitable for use as, for example, a liquid holding item such as a battery separator, a molding fiberboard, a heat sealing paper for use in the production of, for example, a tea bag paper, a sterilizing paper for use in, for example, a bag for sterilized instrument and a desiccant bag or the like.

Furthermore, the polyolefin synthetic pulp of the present invention can be processed into various forms to thereby find various applications.

For example, the polyolefin synthetic pulp of the present invention can be dried and pulverized into cottonlike form for appropriate use as, for example a thickening additive to antisagging agents for paints and the like, sealers, sealants, caulking materials, adhesives, etc. Further, the polyolefin synthetic pulp can be mixed with natural pulp such as wood pulp and formed into a water resistant sheet for appropriate use as, for example, a label paper, a tissue paper, a towel paper or a wiping material. Still further, the polyolefin synthetic pulp can be mixed with other synthetic fibers and sheeted for appropriate use as, for example, a synthetic paper or an in-mold label paper. Still further, the polyolefin synthetic pulp can be mixed with other pulverized pulp or the like and formed in to a sheet or mat for appropriate use as, for example, an absorbent sheet or mat for liquids such as water, oil, solvents and urine. Still further, the polyolefin synthetic pulp can be mixed with split yarn for appropriate use as, for example, an electric cable covering, an insulating paper or a dry binder such as a book cover.

Moreover, the polyolefin synthetic pulp of the present invention can be used as a cement product such as a fiber cement, a gas filter, a liquid filter, a mask, a filter material such as a ceramic paper, a molding fiberboard such as a paper tray, a hanging paper, a backing material for cushion floor, reinforcing fibers for wall material, a tile grout, a filtration auxiliary, etc.

Main uses of the polyolefin synthetic pulp of the present invention will be described in greater detail below.

<Heat sealing paper>

Mixed type or double layer type heat sealing paper can appropriately be produced from the polyolefin synthetic pulp of the present invention.

Mixed type heat sealing paper can be obtained by mixing about 20 to 80% by weight, based on the total weight, of the polyolefin synthetic pulp of the present invention with cellulose pulp and forming the mixture into a paper.

Especially preferred double layer type heat sealing paper is a laminate obtained by forming the polyolefin synthetic pulp into a sheet whose basis weight is in the range of about 2 to 20 g/m², laminating the sheet onto at least one side of a base fiber layer formed from cellulose pulp or the like and heating the laminate by means of a heating oven, heating rolls or the like so that the a sheet and the layer are unified with each other. The thus obtained laminate exhibits a high interlayer bonding strength between the layer of polyolefin synthetic pulp sheet and the base fiber layer, is free from such a fusion to a hot plate at a heat sealing step in use that lowers production efficiency, and can accomplish heat sealing with a high seal strength.

This heat sealing paper possesses excellent heat sealing properties and is especially suitable for use in, for example, tea bags, sterilizing papers and desiccant bags.

The use of the polyolefin synthetic pulp of the present invention, especially the polyolefin synthetic pulp composed of graft-modified polyolefin resin according to the present invention, enables reducing the thickness of heat sealing paper to a greater degree than in the use of conventional synthetic pulps.

<Battery separator>

The polyolefin synthetic pulp of the present invention is especially suitable for use in the production of battery separators. In particular, the polyolefin synthetic pulp can be used an a binder for inorganic powder contained in battery separators.

Any of conventional processes can be employed in the preparation of battery separators. The preparation can be effected by, for example, the process in which the synthetic pulp, polyolefin single fibers and silica as an inorganic powder are mixed together and formed into a paper, or the process in which the synthetic pulp is mixed with glass fiber and formed into a paper.

The use of the polyolefin synthetic pulp of the present invention, especially the polyolefin synthetic pulp composed of graft-modified polyolefin resin according to the present invention, enables reducing the thickness of battery separator to a greater degree than in the use of conventional synthetic pulps.

<Molding fiberboard>

As aforementioned, the modified polyolefin synthetic pulp of the present invention is especially suitable for use as a binder in molding fiberboards, particularly molding fiberboards for automobiles. Any of conventional processes can be employed in the preparation of molding fiberboards. The preparation can be effected by, for example, the process in which cellulose pulp, the synthetic pulp and talc are mixed together and formed into a paper. The use of the polyolefin synthetic pulp of the present invention, especially the polyolefin synthetic pulp composed of graft-modified polyolefin resin according to the present invention, enables reducing the thickness of molding fiberboard to a greater degree than in the use of conventional synthetic pulps.

EFFECT OF THE INVENTION

The present invention provides the polyolefin synthetic pulp which can be appropriately employed in various uses, for example, use in the production of battery separators, molding fiberboards, heat sealing papers and the like.

In particular, the first polyolefin synthetic pulp composed of modified polyolefin resin according to the present invention has a larger fiber breaking length and a greater internal bond strength than those of the polypropylene (PP) single fibers and synthetic pulp prepared from conventional polyolefin resins as starting materials. Further, the heat seal strength thereof is comparable to or greater than that of the conventional PP fibers and synthetic pulps. Therefore, the use of the polyolefin synthetic pulp of the present invention enables reducing the thickness of battery separators, molding fiberboards, heat sealing papers and the like to a greater degree than in the use of conventional synthetic pulps. The second polyolefin synthetic pulp composed of ethylene/α, β-unsaturated carboxylic acid copolymer and polyethylene resin according to the present invention exhibits stable heat sealing and hot tack properties over a wide seal temperature range from low to high temperature. The use of this polyolefin synthetic pulp enables producing the heat sealing paper which is especially suitable to high-speed apparatuses such as a high-speed bag making machine.

The heat sealing paper of the present invention is excellent in internal bond strength and exhibits stable heat sealing and hot tack properties over a wide temperature range from low to high temperature Thus, the heat sealing paper is suitable to high-speed apparatuses and, for example, can be appropriately utilized in the production of tea bags, etc. with the use of a high-speed bag making machine.

EXAMPLE

The present invention will further be illustrated below with reference to the following Examples which in no way limit the scope of the invention.

In the Examples and Comparative Examples, the properties of synthetic pulp and mixed paper were measured by the following methods.

(1) Average Fiber Length:

The average fiber length (mm) per unit weight a was determined by making measurement with the use of automatic fiber length meter (model FS-200, manufactured by Kajaani, Finland).

(2) Freeness According to Canadian Standard Freeness (CSF):

Canadian Standard Freeness (unit: cc) was measured in accordance with Japanese Industrial Standard (JIB) P-8121.

(3) Heat Seal Strength:

<Method of heat sealing>

Heat sealing was performed by the use of heat seal tester manufactured by Tester Sangyo K. K. under the following conditions. Seal temperature is specified in Tables.

seal bar width: 10.0 mm, seal pressure: 1.0 kgf/cm$^2$, seal time: 1.0 s, and seal temperature: specified in Tables (the upper bar and the lower bar had the same temperature).

<Measurement of heat seal strength>

Specimen paper having been heat sealed under the a above conditions and allowed to cool was subjected to a tensile peeling test, which was conducted by the use of a constant-speed tensile tester under the following conditions:

shape of specimen paper: 15 mm width and 50 mm length, pulling speed: 100 mm/min, and ambient temperature at measuring: 23° C.

(4) Breaking Length:

The breaking length was measured in accordance with JIS P-8113.

(5) Internal Bond Strength:

The internal bond strength was measured in accordance with JAPAN TAPPI paper pulp testing procedure No. 54.

(6) Hot Tack Property:

Two double layer hand sheets were piled one upon the other so that the synthetic pulp layers contacted each other. Heat sealing thereof was performed at each of 130° C., 150° C., 170° C. and 190° C. under a pressure of 1 kg/cm$^2$ for 0.5 sec. Thereafter, a load of 45 g was applied, and the length (mm) of peeled seal portion was measured. The hot tack property was evaluated by this length.

Referential Example 1

20 lit. of n-hexane (23° C.), 20 lit. of water (23° C.), 1000 g of ethylene/1-butene random copolymer modified with maleic anhydride (MFR (measured at 190° C. under a load of 2.16 kg in accordance with ASTM D-1238)=3.5 g/10 min, melting point=123° C., and graft ratio=0.86%) and 20 g of polyvinyl alcohol (PVA, degree of saponification=99%, viscosity of 4% aqueous solution (20° C.)=4.6 to 6.0 cps, and trade name=Gohsenol NL-05, produced by The Nippon Synthetic Chemical Industry Co., Ltd.) were charged into a 80 lit. autoclave equipped with a baffle and an agitator. The liquid mixture was heated while agitating at a revolution speed of 900 rpm until the temperature of the liquid mixture became 145° C. Thereafter, the liquid mixture was further agitated for 30 min while maintaining the temperature of the liquid mixture at 145° C. Thus, a suspension was obtained.

Subsequently, this suspension was flashed from a nozzle of 3 mm diameter and 20 mm length, fitted to the autoclave, through a pipe into a drum wherein the atmosphere consisted of nitrogen and the pressure was set at 400 mmHg to thereby effect a rapid solvent evaporation. Thus, a fibrous product was obtained.

The thus obtained fibrous product was introduced in a receiving vessel, wherein the fibrous product was converted to a water slurry of 10 g/lit. concentration. The water slurry was beaten by means of a disk refiner of 12 inch diameter, thereby obtaining a synthetic pulp of ethylene/1-butene random copolymer modified with maleic anhydride. The properties of this synthetic pulp are given in Table 1.

0.48 g of the thus obtained synthetic pulp and 0.72 g of wood pulp (needle-leaved tree (coniferous tree) bleached kraft pulp, NBKP, CSF=350 cc) together with 2 lit. of water were charged into a JIS type pulper and agitated and mixed for 10 min. Thus, a water slurry was obtained.

Thereafter, a mixed paper of 60 g/m² basis weight was produced from this water slurry with the use of a cylinder paper machine of 159 mm diameter This mixed paper was dried for 2 min by means of a rotary drying apparatus whose surface temperature was set at 110° C. Further, heat treatment of the mixed paper was performed for 2 min with the surface temperature set at 135° C. Thus, a desired mixed paper was obtained.

The heat seal strength, breaking length and internal bond strength of the thus obtained mixed paper were measured by the above methods. The results are given in Table 2.

Referential Example 2

A synthetic pulp and a mixed paper (heat treatment temperature=145° C.) were produced in the same manner as in Referential Example 1, except that ethylene homopolymer modified with maleic anhydride (MFR (measured at 190° C. under a load of 2.16 kg in accordance with ASTM D-1238)=5.2 g/10 min, melting point=134° C., and graft ratio=0.44%) was used in place of the ethylene/1-butene random copolymer modified with maleic anhydride. The heat seal strength, breaking length and internal bond strength of the thus obtained mixed paper were measured by the above methods. The results are given in Table 2.

Referential Example 3

A synthetic pulp and a mixed paper (heat treatment temperature=175° C.) were produced in the same manner as in Referential Example 1, except that propylene homopolymer modified with maleic anhydride (MFR (measured at 230° C. under a load of 2.16 kg in accordance with ASTM D-1238)=11 g/10 min, melting point=165° C., and graft ratio=0.60%) was used in place of the ethylene/1-butene random copolymer modified with maleic anhydride. The heat seal strength, breaking length and internal bond strength of the thus obtained mixed paper were measured by the above methods. The results are given in Table 2.

Comparative Example 1

A mixed paper (heat treatment temperature=175° C.) was produced in the same manner as Referential Example 1, except that PP single fibers (MFR (measured at 230° C. under a load of 2.16 kg in accordance with ASTM D-1238)= 30 g/10 min and melting point=165° C.) was used in place of the synthetic pulp. The heat seal strength, breaking length and internal bond strength of the thus obtained mixed paper were measured by the above methods. The results are given in Table 2.

TABLE 1

|  | Ref. Ex. 1 | Ref. Ex. 2 | Ref. Ex. 3 | Comp. Ex. 1 |
|---|---|---|---|---|
| polyolefin resin | *1 | *2 | *3 | *4 |
| av. fiber length (mm) | 1.4 | 1.7 | 1.2 | 5.0 |
| CSF (cc) | 600 | 570 | 650 | — |

*1:ethylene/1-butene random copolymer modified with maleic anhydride
*2:ethylene homopolymer modified with maleic anhydride
*3:propylene homopolymer modified with maleic anhydride
*4:PP single fibers

TABLE 2

|  | Ref. Exp. 1 | Ref. Exp. 2 | Ref. Exp. 3 | Comp. Ex. 1 |
|---|---|---|---|---|
| breaking length (km) | 4.0 | 4.9 | 5.4 | 3.2 |
| internal bond strength (kg · cm) | 4.9 | 4.9 | 3.9 | 0.9 |
| heat seal strength (g/15 mm) | | | | |
| seal temp. 180° C. | 136 | 115 | 116 | 111 |
| 190° C. | 133 | 138 | 133 | 120 |

Example 1

20 lit. of n-hexane (23° C.), 20 lit. of water (23° C.), 700 g of ethylene/methacrylic acid copolymer (MFR (190° C.) 1.5 g/10 min, melting point=99° C., and methacrylic acid content=9% by weight), 300 g of high-density polyethylene (MFR (190° C.)=13 g/10 min, melting point=135° C., and density=0.965 g/cm³) and 20 g of polyvinyl alcohol (PVA) (degree of saponification=99%, viscosity of 4% aqueous solution (20° C)=4.6 to 6.0 cps, and trade name=Gohsenol NL-05, produced by The Nippon Synthetic Chemical Industry Co., Ltd.) were charged into an 80 lit. autoclave equipped with a baffle and an agitator. The liquid mixture was heated while agitating at a revolution speed of 900 rpm until the temperature of the liquid mixture became 145° C. Thereafter, the liquid mixture was further agitated for 30 min while maintaining the temperature of the liquid mixture at 145° C. Thus, a suspension was obtained.

Subsequently, this suspension was flashed from a nozzle of 3 mm diameter and 20 mm length, fitted to the autoclave, through a pipe into a drum wherein the atmosphere consisted of nitrogen and the pressure was set at 400 mmHg to thereby effect a rapid solvent evaporation. Thus, a fibrous product was obtained.

The thus obtained fibrous product was introduce in a receiving vessel, wherein the fibrous product was converted to a water slurry of 10 g/lit. concentration. The water slurry was beaten by means of a disk refiner of 12 inch diameter, thereby obtaining a pulp product. The properties of the thus obtained synthetic pulp are given in Table 3.

The thus obtained synthetic pulp (basis weight 4 g/m²) was combined with a tea bag base paper 100% consisting of abaca pulp fibers (basis weight: 14 g/m²), thereby obtaining a double layer paper. This double layer paper was dried at 50° C. for 5 min by means of a hot air dryer. Further, heat treatment of the double layer paper was performed at 190° C. for 1 min. The heat seal strength and hot tack property of the resultant double layer paper were measured, and the results are given in Table 4.

Example 2

A synthetic pulp and a double layer paper were produced in the same manner as in Example 4, except that ethylene/

1-hexene random copolymer (MFR (190° C.)=4 g/10 min, melting point=122° C., 1 hexene content=8.5% by weight, and density=0.920 g/cm$^3$) was used in place of the high-density polyethylene. The best seal strength and hot tack property of the obtained double layer paper were measured, and the results were also given in Table 4.

A synthetic pulp and a double layer paper were produced in the same manner as in Example 1 except that only the above high-density polyethylene was used in place of the mixture of ethylene/methacrylic acid copolymer and high-density polyethylene. The heat seal strength and hot tack property of the obtained double layer paper were measured, and the results are also given in Table 4.

Comparative Example 3

A double layer paper was produced in the same manner as in Example 1, except that single fibers of polypropylene (PP)) (MFR (230° C.)=30 g/10 min and melting point=165° C.) were used in place of the synthetic pulp. The heat seal strenght and hot tack property of the obtained double layer paper were measured, and the results are also given in Table 4.

TABLE 3

|  | Example 1 | Example 2 | Comp.Ex.2 | Comp. Ex.3 |
| --- | --- | --- | --- | --- |
| Compsn. of synthetic pulp layer (wt %) |  |  |  |  |
| ethylene/methacrylic acid copolymer | 70 | 70 | — | — |
| high-density polyethylene | 30 | — | 100 | — |
| ethylene/1-hexene copolymer | — | 30 | — | — |
| PP single fiber layer | — | — | — | 100 |
| av. fiber length (mm) | 1.0 | 1.1 | 0.9 | 5.0 |
| CFS (cc) | 670 | 690 | 640 | — |

TABLE 4

|  | Example 1 | Example 2 | Comp.Ex.2 | Comp.Ex.3 |
| --- | --- | --- | --- | --- |
| heat seal strength (g/15 mm) |  |  |  |  |
| seal temp. 130° C. | 220 | 180 | 0 | 0 |
| 150° C. | 227 | 196 | 182 | 36 |
| 170° C. | 233 | 219 | 188 | 210 |
| 190° C. | 227 | 202 | 180 | 218 |
| hot tack property (mm) |  |  |  |  |
| seal temp. 130° C. | 40 | 25 | 200 | 200 |
| 150° C. | 25 | 35 | 45 | 200 |
| 170° C. | 35 | 45 | 75 | 30 |
| 190° C. | 65 | 55 | 150 | 15 |

It is apparent from the results of property measurement that, in Examples 1 and 2, a synthetic pulp with desirable fibrous form is obtained and the double layer paper produced therefrom exhibits high heat seal strength under a wide range of temperature conditions from 130 to 190° C., and that the peel strength as a yardstick of hot tack property is low to thereby demonstrate the possession of desirable hot tack property.

What is claimed is:

1. A heat sealing paper comprising a base fiber layer whose at least one surface is laminated with a layer of a polyolefin synthetic pulp which comprises a polyolefin resin graft-modified with an unsaturated carboxylic acid or a derivative thereof.

2. The heat sealing paper as claimed in claim 1, wherein the modified polyolefin resin is an ethylene homopolymer, an ethylene/α-olefin copolymer, a propylene homopolymer or a propylene/α-olefin copolymer, each of these graft-modified with an unsaturated carboxylic acid or a derivative thereof and having a graft ratio of 0.01 to 10% by weight in terms of the unsaturated carboxylic acid or derivative thereof (monomer) based on the weight of polyolefin resin prior to graft modification.

3. The heat sealing paper as claimed in claim 1, wherein the unsaturated carboxylic acid or derivative thereof is maleic anhydride.

4. The heat sealing paper as claimed in claim 2, wherein the unsaturated carboxylic acid or derivative thereof is maleic anhydride.

5. A heat sealing paper comprising a base fiber layer whose at least one surface is laminated with a layer of a polyolefin synthetic pulp which comprises a polyolefin resin composition comprising 50 to 100% by weight of an ethylene/α,β-unsaturated carboxylic acid copolymer, whose α,β-unsaturated carboxylic acid content is in the range of 1 to 20% by weight and 0 to 50% by weight of a polyethylene resin.

6. The heat sealing paper as claimed in claim 5, wherein the polyolefin resin composition comprises 50 to 90% by weight of the ethylene/α,β-unsaturated carboxylic acid copolymer and 10 to 50% by weight of the polyethylene resin.

7. The heat sealing paper as claimed in claim 5, wherein the α,β-unsaturated carboxylic acid is acrylic acid or methacrylic acid.

8. The heat sealing paper as claimed in claim 6, wherein the α,β-unsaturated carboxylic acid is acrylic acid or methacrylic acid.

9. The heat sealing paper as claimed in claim 5, wherein the polyethylene resin is an ethylene homopolymer or an ethylene/α-olefin copolymer.

10. The heat sealing paper as claimed in claim 6, wherein the polyethylene resin is an ethylene homopolymer or an ethylene/α-olefin copolymer.

11. The heat sealing paper as claimed in claim 7, wherein the polyethylene resin is an ethylene homopolymer or an ethylene/α-olefin copolymer.

12. The heat sealing paper as claimed in claim 1, wherein the polyolefin synthetic pulp further comprises polyvinyl alcohol in an amount of 0.01 to 10% by weight based on the total of polyolefin synthetic pulp.

13. The heat sealing paper as claimed in claim 5, wherein the polyolefin synthetic pulp further comprises polyvinyl alcohol in an amount of 0.01 to 10% by weight based on the total of polyolefin synthetic pulp.

14. The heat sealing paper as claimed in claim 1, wherein the polyolefin synthetic pulp has an average fiber length of 0.1 to 10 mm.

15. The heat sealing paper as claimed in claim 5, wherein the polyolefin pulp has an average fiber length of 0.1 to 10 mm.

16. A double layer heat sealing paper laminate comprising a base fiber layer consisting essentially of natural pulp, whose at least one surface is laminated with a layer of a polyolefin synthetic pulp which consists essentially of a polyolefin resin graft-modified with an unsaturated carboxylic acid or a derivative thereof.

17. The double layer heat sealing paper laminate as claimed in claim 16, wherein the modified polyolefin resin is an ethylene homopolymer, an ethylene/α-olefin copolymer, a propylene homopolymer or a propylene/α-olefin copolymer, each of these graft-modified with an unsaturated carboxylic acid or a derivative thereof and having a graft ratio of 0.01 to 10% by weight in terms of the unsaturated carboxylic acid or derivative thereof (monomer) based on the weight of polyolefin resin prior to graft modification.

18. The double layer heat sealing paper laminate as claimed in claim 16, wherein the unsaturated carboxylic acid or derivative thereof is maleic anhydride.

19. The double layer heat sealing paper laminate as claimed in claim 17, wherein the unsaturated carboxylic acid or derivative thereof is maleic anhydride.

20. A double layer heat sealing paper laminate comprising a base fiber layer consisting essentially of natural pulp, whose at least one surface is laminated with a layer of a polyolefin synthetic pulp which consists essentially of a polyolefin resin composition comprising 50 to 100% by weight of an ethylene/α,β-unsaturated carboxylic acid copolymer, whose α,β-unsaturated carboxylic acid content is in the range of 1 to 20% by weight and 0 to 50% by weight of a polyethylene resin.

21. The double layer heat sealing paper laminate as claimed in claim 20, wherein the polyolefin resin composition comprises 50 to 90% by weight of the ethylene/α,β-unsaturated carboxylic acid copolymer and 10 to 50% by weight of the polyethylene resin.

22. The double layer heat sealing paper laminate as claimed in claim 20, wherein the α,β-unsaturated carboxylic acid is acrylic acid or methacrylic acid.

23. The double layer heat sealing paper laminate as claimed in claim 21, wherein the α,β-unsaturated carboxylic acid is acrylic acid or methacrylic acid.

24. The double layer heat sealing paper laminate as claimed in claim 20, wherein the polyethylene resin is an ethylene homopolymer or an ethylene/α-olefin copolymer.

25. The double layer heat sealing paper laminate as claimed in claim 21, wherein the polyethylene resin is an ethylene homopolymer or an ethylene/α-olefin copolymer.

26. The double layer heat sealing paper laminate as claimed in claim 22, wherein the polyethylene resin is an ethylene homopolymer or an ethylene/α-olefin copolymer.

27. The double layer heat sealing paper laminate as claimed in claim 16, wherein the polyolefin synthetic pulp further contains polyvinyl alcohol in an amount of 0.01 to 10% by weight based on the total of polyolefin synthetic pulp.

28. The double layer heat sealing paper laminate as claimed in claim 20, wherein the polyolefin synthetic pulp further contains polyvinyl alcohol in an amount of 0.01 to 10% by weight based on the total of polyolefin synthetic pulp.

29. The double layer heat sealing paper laminate as claimed in claim 16, wherein the polyolefin synthetic pulp has an average fiber length of 0.1 to 10 mm.

30. The double layer heat sealing paper laminate as claimed in claim 20, wherein the polyolefin pulp has an average fiber length of 0.1 to 10 mm.

* * * * *